United States Patent [19]

Turner et al.

[11] Patent Number: 4,957,200
[45] Date of Patent: Sep. 18, 1990

[54] WATER DISTILLATION APPARATUS

[76] Inventors: William F. Turner, Rte. 2, Box 205-T, Stephenville, Tex. 76401; James K. Dews, Star Route, Box 80B, Mineral Wells, Tex. 76067

[21] Appl. No.: 458,330

[22] Filed: Dec. 28, 1989

[51] Int. Cl.$^5$ .............................. B01D 3/02; C02F 1/04
[52] U.S. Cl. ........................... 202/181; 202/185.4; 202/185.5; 202/193; 202/196; 202/197; 202/266; 202/267.1; 203/1; 203/4; 203/10; 203/40; 203/86; 219/275; 219/523
[58] Field of Search .................... 202/267.1, 266, 193, 202/196, 197, 185.3, 185.5, 185.4, 181; 203/1, 10, 4, 40, 86; 219/275, 523

[56] References Cited

U.S. PATENT DOCUMENTS

| | | | |
|---|---|---|---|
| 3,479,949 | 11/1969 | Reynolds et al. | 99/282 |
| 3,532,606 | 10/1970 | Sibert | 202/180 |
| 3,825,491 | 7/1974 | Sanchez | 203/10 |
| 3,838,016 | 9/1974 | Powers | 202/83 |
| 3,935,077 | 1/1976 | Dennison | 202/83 |
| 4,081,331 | 3/1978 | Weiss | 202/181 |
| 4,135,984 | 1/1979 | Kirschmann | 202/83 |
| 4,178,842 | 12/1979 | Vitous | 99/281 |
| 4,187,150 | 2/1980 | Rich | 202/182 |
| 4,247,369 | 1/1981 | Bean | 202/176 |
| 4,252,616 | 2/1981 | Glazer | 203/10 |
| 4,261,796 | 4/1981 | Lemoine | 202/176 |
| 4,269,663 | 5/1981 | McFee | 202/185 |
| 4,339,307 | 7/1982 | Ellis, Jr. | 202/234 |
| 4,342,623 | 8/1982 | Loeffler | 202/185.5 |
| 4,482,431 | 11/1984 | Voorhees | 203/10 |
| 4,612,090 | 9/1986 | Ellis, Jr. | 202/176 |
| 4,687,550 | 8/1987 | Wong | 202/181 |
| 4,818,344 | 4/1989 | Glucksman | 202/176 |

Primary Examiner—Virginia Manoharan
Attorney, Agent, or Firm—Geoffrey A. Mantooth; James C. Fails

[57] ABSTRACT

A water distillation apparatus has an outer chamber and an inner chamber suspended within the outer chamber by support arms. The inner chamber suspends a heating element to create steam. Heat is transferred from the inner chamber to the outer chamber, wherein the heated water in the outer chamber is allowed to degassify. Degassification removes unpleasant tasting chemicals from the water before distillation. Openings are provided for air circulation to remove the gasses. A condenser is also suspended by the support arms. The stem exits the inner chamber and goes into the condenser. A fan provides air circulation through the condenser. The outer chamber is not penetrated by any openings, thereby precluding the possibility of any leaks. The support arms bear on the outer chamber walls; the inner chamber is removed from the outer chamber for cleaning simply by lifting up. In one embodiment the outer and inner chambers are made of a ceramic material to better regulate heat transfer.

31 Claims, 2 Drawing Sheets

WATER DISTILLATION APPARATUS

FIELD OF THE INVENTION

The present invention relates to apparatuses for distilling liquids such as water.

BACKGROUND OF THE INVENTION

Water distillation apparatuses are used to provide distilled water for drinking, appliances, etc. Such apparatuses can be used to produce distilled water commercially, while smaller apparatuses can be used in the home to provide a smaller, even continuous, supply of distilled water.

When distilling water for drinking purposes, it is desirable to remove unpleasant tasting chemicals from the water. Such chemicals include chlorine, sulfates, and some lighter iron oxides. Chlorine mixes well with water at water purification plants. But, after travelling through miles of water distribution pipes from the plant to households, chlorine tends to separate from the water, altering the overall taste. Sulfates give water the taste of rotten eggs. If these chemicals are not removed from the water before distillation, then these chemicals will be distilled with the water.

Removal is typically achieved by degassifying the water before it is distilled. Most of these unpleasant tasting chemicals are more volatile than water. Therefore, the water is heated to a temperature below its boiling point, where the unpleasant tasting chemicals can evaporate. Other chemicals, such as the heavier iron oxides, are removed during the distillation process.

In the prior art, Ellis, Jr., U.S. Pat. No. 4,612,090 shows a two-chamber distiller. The two chambers are physically separate, being located in two housings. A boiling chamber generates steam, which is then condensed in a coil. The condenser coil is located in a second chamber, separate from the boiling chamber. The condenser coil is immersed in water to effect heat transfer to the water, causing the water to degassify. The distiller of the '090 patent suffers from the disadvantage of being prone to leaks. The two chambers are penetrated by apertures below the respective water levels and a conduit connects the two chambers together at points below the water levels. These apertures and conduit make the distiller susceptible to leaks.

McFee, U.S. Pat. No. 4,269,663 shows a distiller having two-chamber construction, but without provisions for degassifying the water. In one embodiment of the distiller, the preheating chamber wall is penetrated by apertures which could leak. In another embodiment, the wall of the preheating chamber is flexible. The flexible wall divides the preheating chamber from a distilled water storage reservoir. Such a distiller has a short life span and is unnecessarily complicated. Furthermore, the distillers are equipped with thermostats to control the heating elements. Thermostats and the like increase the cost of distillers.

SUMMARY OF THE INVENTION

It is an object of the present invention to provide an apparatus for distilling water, which apparatus has no apertures located below the water line to prevent the possibility of leakage.

It is a further object of the present invention to provide an apparatus for distilling water, which apparatus will degassify the water before distillation to remove unpleasant tasting chemicals.

It is a further object of the present invention to provide a two-chamber apparatus for distilling water, which apparatus passively regulates heat transfer between the two chambers.

It is a further object of the present invention to provide a two-chamber apparatus for distilling water, wherein the two chambers can be easily separated for cleaning.

These and other objects will become evident in the following description.

The distillation apparatus of the present invention comprises first chamber means, second chamber means, heating means, support means, and condenser means. The first chamber means has bottom and side walls surrounding a first interior cavity. The first chamber means has an upper opening that communicates with the first interior cavity and the first chamber means is adapted to hold a liquid. The second chamber means has top and side walls surrounding a second interior cavity. The second chamber means has a lower opening communicating with the second interior cavity The second chamber means is located within the first chamber means first interior cavity such that the second chamber means lower opening is in proximity to the first chamber means bottom wall. The heating means heats the liquid in the second chamber means and is coupled to the second chamber means. Support means supports the second chamber means in the first chamber means first interior cavity such that there is no penetration of the first interior cavity below a water line. The support means has passages for air flow to allow degassification. The condenser means is located above the second chamber means and has an inlet that communicates with the second interior cavity and an outlet that exits the apparatus. The condenser means is supported by the support means.

In another aspect, the second chamber means comprises an inverted cup. The cup bottom is open to allow communication between the first and second interior cavities. In still another aspect, the cup is frustum shaped with the cup bottom opening being larger than the cup top wall.

In another aspect, the second chamber means and first chamber means are made of ceramic material. The second chamber means has an opening in its side wall which is located above the bottom opening and below the water line of the first chamber means. The support means comprises plural arms.

With the apparatus of the present invention, the water is degassified before distillation. Degassification removes unpleasant tasting chemicals. Furthermore, the apparatus degassifies the water using a first chamber means having no openings below the water line, thereby precluding the possibility of leaks. The apparatus uses in one aspect ceramic first and second chambers to effectively regulate heat transfer between the chambers and prevent the possibility of burns to people. With the apparatus, the heating element is continuously energized, eliminating the need for thermostats. In another aspect, the first chamber is metal and is located within a ceramic bowl to prevent burns. The second chamber, with its inverted cup shape, is easily removed from the first chamber for cleaning. In fact, the condenser and the second chamber are coupled together to allow their removal as a unit.

DESCRIPTION OF PREFERRED EMBODIMENTS

Figure 1:
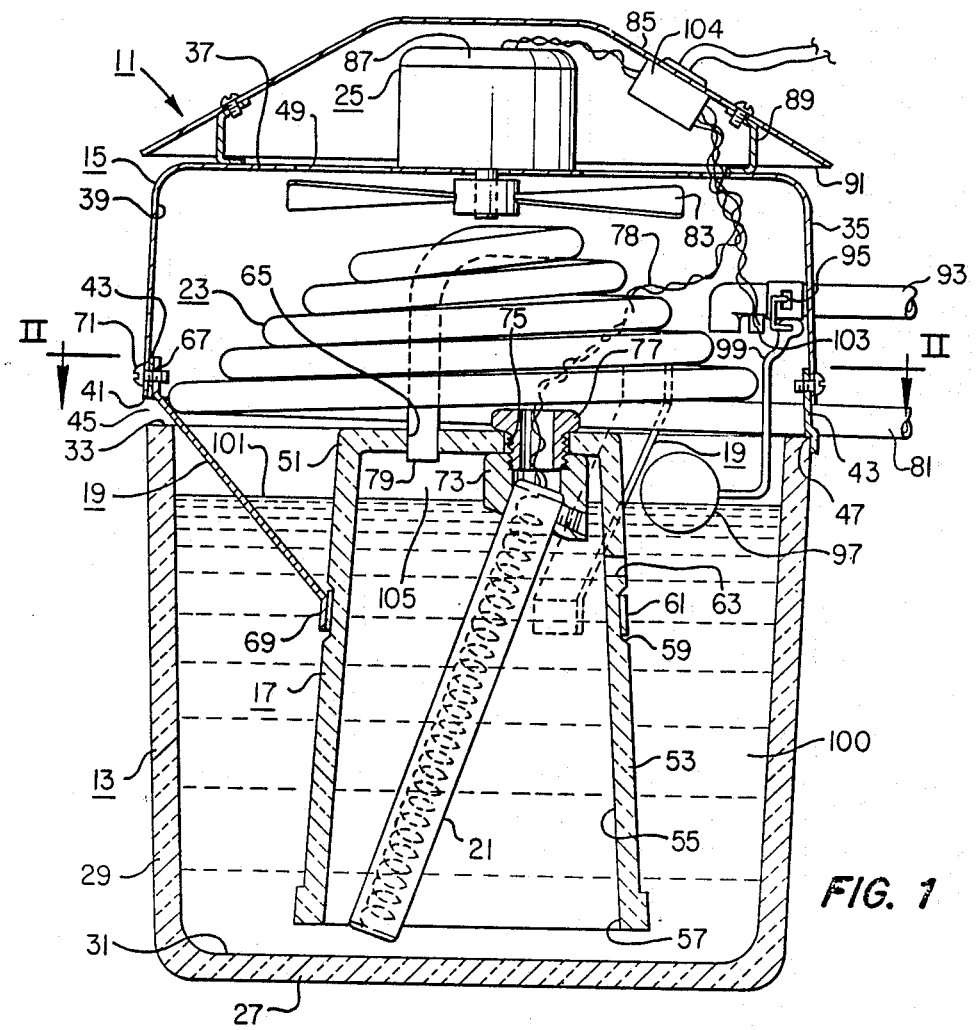
FIG. 1 is a cross-sectional side view of the distiller apparatus of the present invention, in accordance with a preferred embodiment.

In FIG. 1, there is shown a side cross-sectional view of the distiller apparatus 11 of the present invention, in accordance with a preferred embodiment. The distiller apparatus is used to distill water for household use, or other purposes Referring to FIGS. 1 and 2, the distiller apparatus 11 includes an outer chamber 13, a cover 15, an inner chamber 17, support means 19, a heating element 21, a condenser 23, and a fan 25.

The outer chamber 13 is generally bowl shaped, having a bottom wall 27 and a side wall 29 that surrounds an interior cavity 31. The bottom and side walls 27, 29 are integral to each other. The outer chamber 13 has an upper edge 33 located on top of the side wall 29. The top of the outer chamber 13 is open. The outer chamber 13, the walls of which are unpenetrated by any holes or openings, is adapted to hold a liquid such as water 100.

The cover 15 is an inverted bowl, having a side wall 35 and a top wall 37 so as to form an interior cavity 39. The side wall has a lower edge 41. The cover 15 is located above the outer chamber 13 such that the lower edge 41 of the cover side wall 35 is in proximity to the upper edge 33 of the outer chamber side wall 29 and such that the respective interior cavities 31, 39 merge to form one large interior cavity. Standoffs 43 are used to provide a gap 45 between the lower edge 41 of the cover side wall 35 and the upper edge 33 of the outer chamber side wall 29. (In FIG. 1, the left hand standoff 43 is shown broken away to better illustrate the gap 45.) In the preferred embodiment, there are provided at least three standoffs 45, evenly distributed around the perimeter of the cover side wall 35 The standoffs 45 are screwed to the cover side wall 35. The lower ends of the standoffs are bent outwardly so as to form respective bearing surfaces 47. The bearing surfaces 47 contact the upper edge 33 of the outer chamber 13. The standoffs 43 are formed of narrow strips of metal. The cover 15 has openings 49 in its top wall 37 to permit air circulation within the apparatus.

The inner chamber 17 is shaped like an inverted cup, having a top wall 51 and a side wall 53 surrounding an interior cavity 55. The inner chamber 17 has a bottom opening 57 that communicates with the interior cavity 55 The inner chamber 17 is frustum shaped; thus the inside diameter of the inner chamber at the bottom opening 57 is larger than the inside diameter of the inner chamber at the top wall 51. The side wall 53 of the inner chamber 17 has a circumferential groove 59 for receiving a band 61. As will be explained below, the band 61 is used to support the inner chamber 17 within the outer chamber 13. The side wall 53 has an opening 63 that allows communication between the interior cavity 55 of the inner chamber and the interior cavity 31 of the outer chamber 13. The opening 63 is located in the upper portion of the inner chamber 17 such that when the outer chamber 13 is filled to its normal water level 101, the opening 63 is located a short distance below the water level. The top wall 51 also has an opening 65 for the exit of steam from the inner chamber.

The inner chamber 17 is suspended inside of the outer chamber interior cavity 31 with the support means 19. In the preferred embodiment, the support means includes three arms 19. Each arm 19 has outer and inner ends 67, 69. The outer ends 67 are coupled to the cover 15 while the inner ends 69 are coupled to the inner chamber 17. More specifically, the outer ends 67 are coupled to the cover 15, along with the respective standoffs 43, by screws 71. The inner ends 69 are welded to the band 61. The band 61 is a ring clamp that is expandable or contractible with a screw 72. The band 61 is fitted into the groove 59 on the inner chamber 17 and the screw 72 is tightened so as to reduce the diameter of the band, wherein the band is firmly retained inside of the groove.

By using the support means 19, a boiling chamber can be made with the inner chamber 17 without penetrating the walls 27, 29 of the outer chamber 13. The inner chamber 17 is suspended inside the outer chamber 13 such that the bottom opening 57 of the inner chamber is spaced from the bottom wall 27 of the outer chamber 13. Also, the top wall 51 of the inner chamber 17 is located approximately on the same horizontal plane as the upper edge 33 of the outer chamber 13. The inner chamber 17 is centered inside of the outer chamber 13.

The heating element 21 is conventional, being driven by electric current to produce heat. The heating element 21 is suspended in the inner chamber interior cavity 55 from the top wall 51. The top end of the heating element 21 is received by an adapter 73 which in turn is received by an opening 75 in the top wall 51. The adapter 73 is coupled to the top wall 51 by a nut 77. The nut 77 has a passage for receiving the electrical wires 78 of the heating element 21. The elongated heating element 21 extends from the top wall 51 to the bottom opening 57 and is oriented diagonally across the interior cavity 55 of the inner chamber 17.

The condenser 23 is a coil of tubing located within the interior cavity 39 of the cover 15 so as to be above the inner chamber 17. The condenser 23 has an inlet 79 and an outlet 81. The inlet 79 is received by the opening 65 in the inner chamber 17. The outlet 81 exits the apparatus 11 through the gap 45 between the cover 15 and the outer member 13 where it terminates a short distance away. The condenser 23 is conically shaped, having a broader base portion than the top portion. The inlet portion of the condenser rises from the inner chamber top wall 51 to the top portion of the condenser. The inlet portion is located approximately in the center of the condenser. Thus, the steam enters the inlet 79 and rises to the top where it then circulates through the coil, traveling from the top portion to the base portion. The condenser coil 23 is welded to the arms 19. Thus, the arms 19 support the condenser 23 as well as the inner chamber 17.

The fan 25 is mounted on the top wall 37 of the cover 15 between the air openings 49. The fan 25 is centered on the top wall, with the fan blades 83 being located within the cover interior cavity 39. A top 85 is provided over the fan motor 87. The top 85 is mounted to the top wall 37 of the cover 15 by standoffs 89, so as to create air passages 91 between the top and the cover. The fan blades 83 draw in air through the air passages 91, and through the openings 49 in the cover top wall 51. The air then circulates over the condenser 23 and exits through the gap 45 between the cover 15 and the outer chamber 13.

The apparatus 11 may be set up for continuous operation, wherein a water inlet 93 and a regulating valve 95 are provided The inlet 93 enters the interior cavity 39 of the cover 15 through an opening, where water can fall from the inlet mouth down into the outer chamber interior cavity 31. The conventional regulating valve 95 is float-actuated, with the float 97 being located in the outer chamber interior cavity 31 and coupled to the valve by an arm 99. As the water level 101 drops, so does the float 97, opening the valve 95 and letting water flow from the inlet 93 into the inner chamber 13. As the water level reaches its predetermined level, the float 97 rises, closing off the valve 93 and all water flow.

Figure 3:
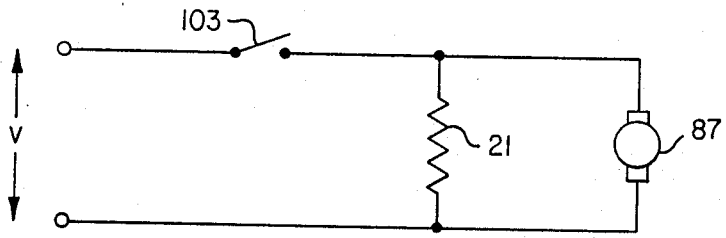
FIG. 3 is an electrical schematic diagram of the electrical components of the distiller apparatus.

The valve 95 is provided with a low water-level microswitch 103. Referring to FIG. 3, the switch 103 is connected in series with the heating element 21 and the fan motor 87. If the water level inside the outer chamber 13 falls too low, the switch 103 is opened by the arm 99, thereby turning off the heating element 21 This prevents the heating element 21 from boiling off all of the water and burning up. The switch 103 is kept normally closed by the float arm 99.

Alternatively, the apparatus 11 may be set up for noncontinuous operation, wherein the outer chamber 13 is manually filled. Although no inlet will be provided in this embodiment, a float-arm-switch assembly 97, 99, 103 would be provided. As the water level dropped due to distillation, when the float 97 reached a predetermined level, it would open the switch 103, thereby shutting off the heating element 21 and the fan motor 87.

The wires from the heating element 21, the fan motor 87 and the switch 103 are routed to a junction box 104 located under the top 85. The apparatus 11 operates with 110 V ac and may be plugged into a conventional electrical wall outlet. Alternatively, in those countries having 220 V ac, the apparatus can be configured to operate with such voltage levels.

In the preferred embodiment, the outer chamber 13 and inner chamber 17 are made of food grade ceramic material The ceramic material has some heat insulation properties and is commonly found in such kitchen appliances as crock pots and other ceramic kitchen ware The condenser 23, the cover 15, the top 85, and the arms 19 are made of stainless steel For an apparatus that will hold about one gallon of water at any given time, the condenser 23 is made of tubing with an outside diameter of ½ inch and a length of ten feet With an apparatus holding about one gallon of water, the heating element 21 is rated at 1500 watts.

To install the apparatus 11 of the present invention, a source of water (not shown) is connected to the inlet 93. Also, a container (not shown) is provided beneath the outlet, to collect the distilled water. The apparatus 11 may be set on top of a counter or table. Its flat bottom wall 27 provides stability that prevents tipping.

The operation of the apparatus 11 will now be described. To begin operation, the water supply is turned on, wherein water from the inlet 93 pours into the outer chamber interior cavity 31. When the water reaches a predetermined level 101 (usually a short distance below the upper edge), the float 97 and valve 95 shut off the flow of water. Because the inner chamber is open at its bottom, water enters the inner chamber interior cavity 55 The water levels inside of the inner and outer chambers 17, 13 are the same. The water level inside of the inner chamber is such that a space 105 is formed between the top wall 51 and the water level 101. This space 105 is for the collection of steam. The apparatus 11 is plugged into an electrical wall outlet, wherein the heating element 21 is continuously energized for as long as the switch 103 remains closed. The heating element 21 heats the water in the inner chamber 17 to 212 degrees F. (at sea level) wherein the water boils and creates steam. The resulting steam exits the inner chamber 17 through the condenser inlet 79. The fan 25 blows cool exterior air over the condenser 23 to aid in condensing the steam. The condensed water exits the apparatus 11 through the outlet 81.

In distilling water, it is often desirable to rid the undistilled water of unpleasant tasting chemicals before the distillation process. Such unpleasant tasting chemicals include chlorine, sulfates, and some iron oxides. This is done by degassification. Degassification involves heating the distilled water and allowing the unpleasant tasting chemicals to evaporate from the water before distilling. Many of the chemicals have a lower boiling point than water. Thus, the outer chamber 13 is used to degassify the water. The inlet 93 feeds water to the top levels of the outer chamber 13 where it is heated by heat transfer from the inner chamber and from the water in the lower levels of the outer chamber. The heated water in the outer chamber degassifies, evaporating the unpleasant tasting chemicals which are blown by the fan 25 of the apparatus through the gap 45. The water in the upper levels of the outer chamber probably exhibits the greatest degassification. As the water moves from the upper levels to the lower levels of the outer chamber, it becomes purer with regard to not having the degassifiable unpleasant tasting chemicals. As water inside of the inner chamber 17 is distilled, the water level inside the inner chamber remains relatively constant by degassified water entering through the bottom opening 57, from the lower levels of the outer chamber 13.

The apparatus 11 passively regulates the amount of heat transferred from the inner chamber 17 to the outer chamber 13, and from the outer chamber 13 to the exterior of the apparatus. By properly regulating heat transfer, the apparatus is more efficient. Furthermore, the apparatus has no need for active devices, such as thermostats, for controlling the heating of the water. Such devices increase the cost of distiller apparatuses.

The apparatus 11 regulates the transfer of heat from the inner chamber to the outer chamber by using a ceramic inner chamber 17, by choosing the size of the heating element 21, and by placing the inner chamber 17 within a certain distance range from the bottom wall 27 of the outer chamber 13. The ceramic inner chamber 17 acts somewhat as a heat insulator, impeding the transfer of heat out of the inner chamber. The size or heat output of the heating element 21 is also a factor. In the preferred embodiment, where about one gallon of water is contained in the apparatus, the heating element is rated at 1500 watts. Also in the preferred embodiment, the bottom opening 57 of the inner chamber 17 is located about one half inch above the bottom wall 27. The hotter the heating element, the more heat that is transferred to the outer chamber. Likewise, the greater the distance the inner chamber 17 is from the bottom wall, the more heat that is transferred to the outer chamber, thereby increasing the water temperature in the outer chamber.

The temperature of the water in the inner chamber 17 is maintained between 205 degrees and 212 degrees F. (depending on altitude), while the temperature of the water in the outer chamber 13 is maintained between 190 degrees and 205 degrees F. (again, depending on altitude). The temperature of the water in the outer chamber 13 is maintained about 10 degrees cooler than the water temperature in the inner chamber. With the water in the outer chamber at this temperature, the apparatus works effectively and efficiently. If the water in the outer chamber is much cooler than 10 degrees below the inner chamber water temperature, it may not properly degassify. If the water in the outer chamber is much hotter than 10 degrees below the inner chamber water temperature, then the water in the outer chamber could boil. Such boiling reduces the efficiency of the apparatus. Furthermore, boiling might cause the water in the outer chamber to undesirably sputter out of the apparatus 11 through the gap 45.

The apparatus 11 regulates the transfer of heat from the outer chamber to the exterior of the apparatus by using a ceramic outer chamber 13. The outer chamber acts, to a certain extent as an insulator, retaining heat inside of the apparatus. This makes the apparatus more efficient by reducing heat loss. In addition, the possibility of burns to people is reduced. The apparatus 11 can be set upon a kitchen counter in a home. In such a location, it can be touched, especially by small children. Because the ceramic outer chamber 13 is cooler than a metal chamber, the possibility of a burn is reduced.

The inner chamber 17 is frustum shaped, being larger on the bottom than on the top. It is believed that this configuration further increases the efficiency of the apparatus by funnelling hot water and heat up to the upper portions of the inner chamber 17.

The inner chamber 17 is provided with a safety feature in the form of the opening 63. The opening 63 is located a short distance below the water line 101 of the outer chamber 13. The opening precludes a substantial differential drop in the water level of the inner chamber 17 relative to the water level of the outer chamber 13 Such a drop in water level in the inner chamber could occur during the distillation process. If the heating element 21 were uncovered for any substantial length of time, it could be damaged. However, with the apparatus of the present invention, once the water level in the inner chamber drops to the opening 63, relatively cooler water from the outer chamber enters the inner chamber and reequalizes water levels. Thus, the heating element is reimmersed in water.

Every few days, it is desirable to clean the apparatus 11 to remove sediments that have accumulated from the distillation process. Cleaning of the apparatus of the present invention is very simple. The cover 15 is lifted off of the outer chamber 13. The inner chamber 17 and condenser 23 are attached to the cover 15, so that they are all lifted off as a unit. The outer chamber and inner chamber are then cleaned. There are no openings in the outer chamber 13 to collect sediment or scale, further simplifying cleaning. To reassemble, the cover and associated inner chamber and condenser are simply placed back on top of the outer chamber.

Figure 4:
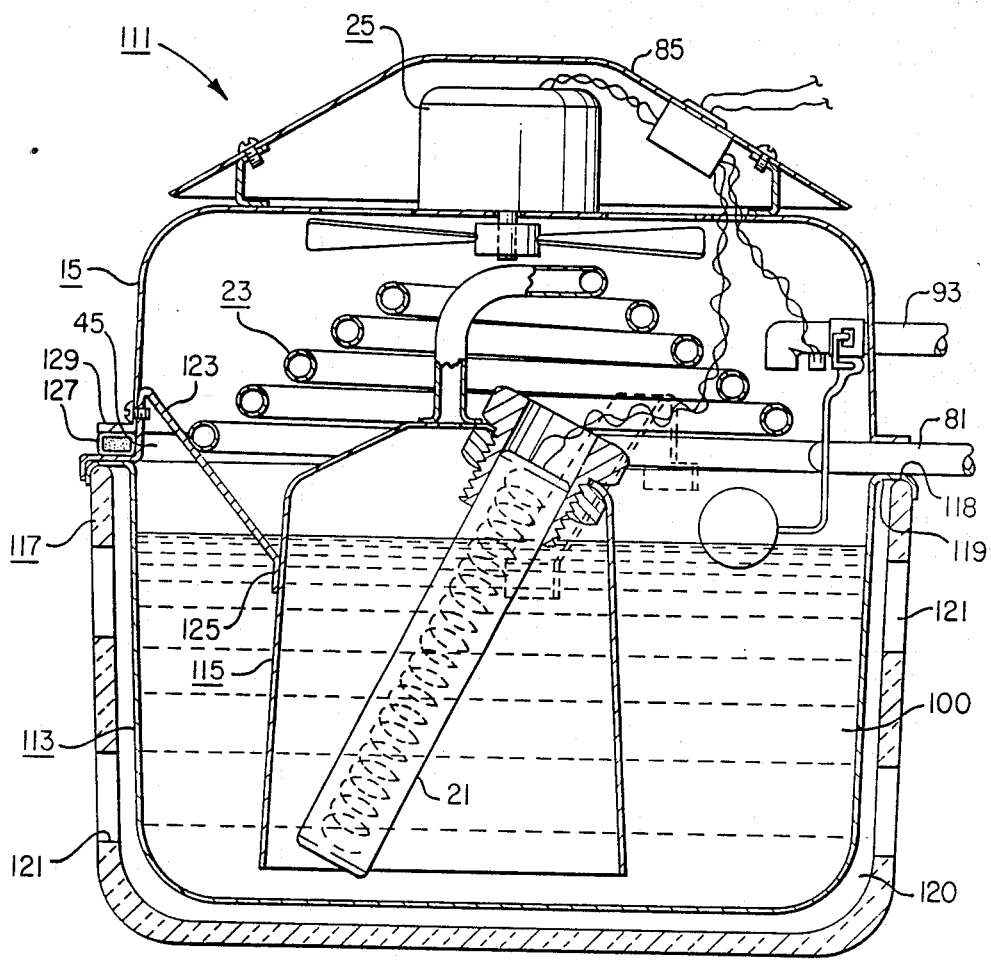
FIG. 4 is a cross-sectional side view of the distiller apparatus of the present invention, in accordance with another embodiment.

In FIG. 4, there is shown a cross-sectional side view of the apparatus 111, in accordance with another embodiment. The apparatus 111 is similar to the apparatus 11 of FIGS. 1 and 2, but with the following changes.

The apparatus 111 has stainless steel outer and inner chambers 113, 115. The outer chamber 113 is contained within a ceramic outer bowl 117 for protection against burns to people. The outer chamber 113 has an outer lip 119 that bears on the upper edge 118 of the outer bowl 117. The outer chamber 113 is suspended within the outer bowl 117 by the lip 119 such that there is an air space 120 between the outer chamber and the outer bowl. The outer bowl 117 has slotted openings 121 therethrough to provide air circulation between the outer bowl and the outer chamber 113. Such air circulation acts to maintain the outer bowl 117 at relatively cool temperatures. Also, each support means 123 includes an integral arm and standoff. Each support means 123 is a strip of stainless steel, bent into the appropriate shape. The inner end 125 of each arm is welded to the outside of the inner chamber 115.

The apparatus 11 is provided with a filter 127 located by the gap 45. If the water which is being distilled is heavily chlorinated, the degassification process will produce a relatively large amount of chlorine gas in the room where the distiller is located. The filter 127 removes the chlorine from the air exiting the gap 45. The filter 127 includes bentonite and activated charcoal, enclosed within a permeable paper container. The filter 127 is ring shaped and fills the gap 45. The cover has a radially extending lip 129 so that the filter is located between the lip 129 and the outer lip 119.

Figure 2:
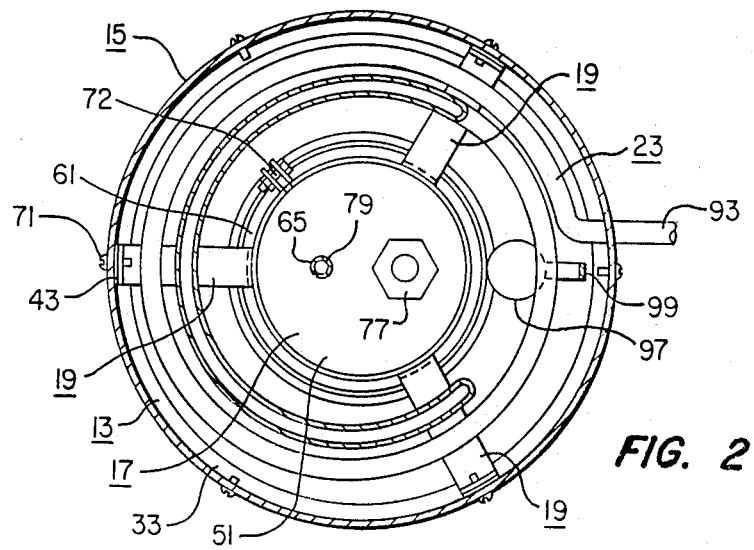
FIG. 2 is a cross-sectional top view of the distiller apparatus, taken along lines II—II of FIG. 1.

Although the apparatus 111 has been described as having a stainless steel inner chamber 115, the inner chamber could be made of ceramic material, as described with respect to FIGS. 1 and 2.

The foregoing disclosure and the showings made in the drawings are merely illustrative of the principles of the invention and are not to be interpreted in a limiting sense.

We claim:

1. A distillation apparatus, comprising:
   (a) a first chamber means having bottom and side walls surrounding a first interior cavity, said first chamber means having an upper opening communicating with said first interior cavity, said first chamber means being adapted to hold a liquid;
   (b) second chamber means having top and side walls surrounding a second interior cavity, said second chamber means having a lower opening communicating with said second interior cavity, said second chamber means being located within said first chamber means first interior cavity such that said second chamber means lower opening is in proximity to said first chamber means bottom wall;
   (c) heating means for heating liquid in said distillation apparatus, said heating means being coupled to said second chamber means so as to be located inside said second interior cavity;
   (d) means defining passages for air flow in and out of said apparatus;
   (e) support means for supporting said second chamber means in said first chamber means first interior cavity such that there is no penetration of said first interior cavity below a water line when said first chamber means is filled with liquid, said support means having passages for air flow so as to allow said liquid to degassify before distillation;
   (f) condenser means located above said second chamber means, said condenser means having an inlet which communicates with the second interior cavity for receiving vapor from said liquid, and an outlet which exits said apparatus, said condenser means being supported by said support means.

2. The apparatus of claim 1 wherein said first chamber means comprises a bowl made of ceramic material.

3. The apparatus of claim 2 wherein said support means comprises plural arms having two ends, with one end of each arm bearing on an upper lip of said first chamber means and the other end of each arm being coupled to said second chamber means.

4. The apparatus of claim 3 wherein said second chamber means has an opening in its side wall, said opening being located above said lower opening and below the water line of said first chamber means.

5. The apparatus of claim 1 wherein said apparatus further comprises inlet means for providing undistilled liquid to said first chamber means, said inlet means being located above said first chamber means.

6. The apparatus of claim 5 wherein said inlet means comprises valve means for automatically shutting off the flow of liquid into said first chamber means when said liquid in said first chamber means reaches a predetermined level.

7. The apparatus of claim 5 wherein said second chamber means has an opening in its side wall, said opening being located above said lower opening and below the water line of said first chamber means.

8. The apparatus of claim 7 wherein said support means comprises plural arms having two ends, with one end of each arm bearing on an upper lip of said first chamber means and the other end of each arm being coupled to said second chamber means.

9. The apparatus of claim 8 wherein said first chamber means comprises a bowl made of ceramic material.

10. The apparatus of claim 1 wherein said first chamber means comprises a bowl made of ceramic material and said second chamber is made of ceramic material.

11. The apparatus of claim 1 wherein said support means comprises plural arms having two ends, with one end of each arm bearing on an upper lip of said first chamber means and the other end of each arm being coupled to said second chamber means.

12. The apparatus of claim 1 wherein said second chamber means has an opening in its side wall, said opening being located above said lower opening and below the water line of said first chamber means.

13. The apparatus of claim 1 further comprising fan means for circulating air through said apparatus, said fan means located above said first chamber means.

14. The apparatus of claim 1 wherein said second chamber means is made of ceramic material.

15. The apparatus of claim 14 wherein said first chamber means is made of metal, said apparatus further comprising an outer bowl made of ceramic material, said first chamber means fitting within said outer bowl such that there is an air space between said first chamber means and said outer bowl, said outer bowl having openings for permitting air circulation within said air space.

16. The apparatus of claim 1 wherein said first chamber means is made of metal, said apparatus further comprising an outer bowl made of ceramic material, said first chamber means fitting within said outer bowl such that there is an air space between said first chamber means and said outer bowl, said outer bowl having openings for permitting air circulation within said air space.

17. A distillation apparatus, comprising:

(a) a first chamber means having bottom and side walls surrounding a first interior cavity, said first chamber means having an upper opening communicating with said first interior cavity, said first chamber means being adapted to hold a liquid;

(b) second chamber means comprising an inverted cup so as to have top and side walls surrounding a second interior cavity, said cup bottom being open to allow communication between said first interior cavity and said second interior cavity, said cup being located in said first interior cavity such that said cup bottom opening faces said first chamber means bottom wall and said cup top wall is located above said cup bottom opening;

(c) heating means for heating liquid in said first chamber means, said heating means being located inside of said second interior cavity, said heating means being mounted to said cup so as to be immersed in said liquid in said second chamber means;

(d) support means for supporting said cup means in said first chamber means first interior cavity such that there is no penetration of said first interior cavity below a water line of said first chamber means when said first chamber means is filled with liquid, said support means bearing on said first chamber means and allowing removal of said cup for cleaning of said distillation apparatus;

(e) condenser means located above said second chamber means, said condenser means having an inlet which communicates with the second interior cavity for receiving vapor from said liquid, and an outlet which exits said apparatus, said condenser means being supported by said support means.

18. The apparatus of claim 17 wherein said cup is frustum shaped with the cup bottom opening being larger than the cup top wall.

19. The apparatus of claim 18 wherein said cup is made of ceramic material.

20. The apparatus of claim 19 wherein said cup side wall has an opening allowing communication between said first interior cavity and said second interior cavity, said opening being located between said cup bottom opening and said top wall.

21. The apparatus of claim 17 wherein said first chamber means comprises a bowl made of ceramic material.

22. The apparatus of claim 17 wherein said support means comprises plural arms having two ends, with one end of each arm bearing on an upper lip of said first chamber means and the other end of each arm being coupled to said second chamber means.

23. A distillation apparatus, comprising:

(a) a first chamber means having bottom and side walls surrounding a first interior cavity, said first chamber means having an upper opening communicating with said first interior cavity, said first chamber means being adapted to hold a liquid;

(b) second chamber means comprising an inverted cup so as to have top and side walls surrounding a second interior cavity, said cup bottom being open to allow communication between said first interior cavity and said second interior cavity, said cup being located in said first interior cavity such that said cup bottom opening faces said first chamber means bottom wall and said cup top wall is located above said cup bottom opening;

(c) heating means for heating liquid in said first chamber means, said heating means being located inside of said second interior cavity, said heating means being mounted to said cup so as to be immersed in said liquid in said second chamber means;

(d) means defining passages for air flow in and out of said apparatus;

(e) support means for supporting said second chamber means in said first chamber means first interior cavity such that there is no penetration of said first interior cavity below a water line when said first chamber means is filled with liquid, said support means having passages for air flow so as to allow said liquid to degassify before distillation;

(f) condenser means located above said second chamber means, said condenser means having an inlet which communicates with the second interior cavity for receiving vapor from said liquid, and an outlet which exits said apparatus, said condenser means being supported by said support means.

24. The apparatus of claim 23 further comprising fan means for circulating air through said apparatus, said fan means located above said first chamber means.

25. The apparatus of claim 24 wherein said cup is frustum shaped with the cup lower opening being larger than the cup top wall, said cup being made of a ceramic material.

26. The apparatus of claim 25 wherein said cup side wall has an opening allowing communication between said first interior cavity and said second interior cavity, said opening being located between said cup bottom opening and said top wall.

27. The apparatus of claim 26 wherein said first chamber means comprises a bowl made of ceramic material.

28. The apparatus of claim 26 wherein said support means comprises plural arm means, with each arm means having an inner end and an outer end, said respective outer ends being adapted to bear on an upper lip of said first chamber means, said respective inner ends being coupled to clamp means, said clamp means being received by a circumferential groove in said cup.

29. The apparatus of claim 23 wherein said first chamber means comprises a bowl made of ceramic material.

30. The apparatus of claim 23 wherein said support means comprises plural arm means, with each arm means having an inner end and an outer end, said respective outer ends being adapted to bear on an upper lip of said first chamber means, said respective inner ends being coupled to clamp means, said clamp means being received by a circumferential groove in said cup.

31. A distillation apparatus, comprising:

(a) a first chamber means having bottom and side walls surrounding a first interior cavity, said first chamber means having an upper opening communicating with said first interior cavity, said first chamber means being adapted to hold a liquid, said first chamber means comprising a bowl made of ceramic material;

(b) a cover having top and side walls forming an inverted bowl;

(c) second chamber means comprising an inverted cup so as to have top and side walls surrounding a second interior cavity, said cup bottom being open to allow communication between said first interior cavity and said second interior cavity, said cup being located in said first interior cavity such that said cup bottom opening is in proximity with said first chamber means bottom wall and said cup top wall is located above said cup bottom opening;

(d) heating means for heating liquid in said first chamber means, said heating means being located inside of said second interior cavity, said heating means being mounted to said cup so as to be immersed in said liquid in said second chamber means, said heating means continuously heating said liquid for as long as the level of said liquid is maintained within a predetermined range in said first chamber means;

(e) support means for supporting said cover and said second chamber means, said second chamber means being supported in said first chamber means first interior cavity such that there is no penetration of said first interior cavity below a water line of said first chamber means, said cover being supported above said first chamber means such that there is a gap between said first chamber means and said cover, said cover comprising openings in its top wall to provide for air circulation within said apparatus, said support means comprising plural arms with each arm having inner and outer ends, said outer ends being coupled to said cover, said inner ends being coupled to said second chamber means;

(f) said cup being frustum shaped with the cup bottom opening being larger than the cup top wall, said cup being made of a ceramic material, said cup side wall having an opening allowing communication between said first interior cavity and said second interior cavity, said opening being located between said cup bottom opening and said top wall such that said opening is below the liquid level of said first chamber means;

(g) condenser means located above said second chamber means, said condenser means having an inlet which communicates with the second interior cavity for receiving vapor from said liquid, and an outlet which exits said apparatus, said condenser means being supported by said support means;

(h) fan means for circulating air through said apparatus, said fan means located above said condenser means;

(i) inlet means for providing undistilled liquid to said first chamber means, said inlet means being located above said first chamber means, and valve means for automatically shutting off the flow of liquid into said first chamber means when said liquid in said first chamber means reaches a predetermined level.

* * * * *